United States Patent [19]
Evans et al.

[11] Patent Number: 5,839,219
[45] Date of Patent: Nov. 24, 1998

[54] METHOD OF COATING A FISHING FLY AND A FISHING FLY COATED THEREBY

[75] Inventors: Charles P. Evans, Trumbull; Armand Moscovici, Woodbridge; Robert C. Evans, Naugatuck, all of Conn.

[73] Assignee: Vitek Research Corporation, Derby, Conn.

[21] Appl. No.: 853,020

[22] Filed: May 8, 1997

[51] Int. Cl.⁶ .................................................. A01N 25/00
[52] U.S. Cl. ........................................................ 43/42.53
[58] Field of Search ................................ 43/42.25, 42.53

[56] References Cited

U.S. PATENT DOCUMENTS

| | | | |
|---|---|---|---|
| 2,775,055 | 12/1956 | Waugh et al. | 43/42.25 |
| 3,477,164 | 11/1969 | Novak | 43/42.09 |
| 3,500,574 | 3/1970 | Putnam | 43/42.25 |
| 3,690,029 | 9/1972 | Pobst | 43/42.25 |
| 3,724,119 | 4/1973 | Putnam | 43/42.25 |
| 3,750,322 | 8/1973 | Putnam | 43/42.25 |
| 3,805,438 | 4/1974 | McLaughlin | 43/42.74 |
| 4,023,301 | 5/1977 | Warner | 43/42.25 |
| 4,411,089 | 10/1983 | Runeric | 43/42.53 |
| 4,559,736 | 12/1985 | Sienkiewicz | 43/42.25 |
| 4,773,181 | 9/1988 | Radden | 43/42.37 |
| 4,777,759 | 10/1988 | Wulff | 43/42.25 |
| 4,967,505 | 11/1990 | Wulff | 43/42.05 |
| 5,097,621 | 3/1992 | Hnizdor | 43/42.53 |
| 5,127,183 | 7/1992 | Wulff | 43/42.25 |
| 5,172,509 | 12/1992 | Motovik | 43/25.2 |
| 5,209,008 | 5/1993 | Kasznica | 43/42.53 |
| 5,353,545 | 10/1994 | Masetti | 43/42.25 |
| 5,446,991 | 9/1995 | Brackus | 43/42.37 |
| 5,482,582 | 1/1996 | Puglisi | 156/74 |
| 5,664,363 | 9/1997 | Keenan | 43/42.06 |

FOREIGN PATENT DOCUMENTS

| | | | |
|---|---|---|---|
| 443400 | 2/1936 | United Kingdom | 43/42.53 |
| 1425212 | 2/1976 | United Kingdom | . |
| 0380735 | 8/1990 | United Kingdom | . |

*Primary Examiner*—Thomas Price
*Attorney, Agent, or Firm*—Ware, Fressola, Van Der Sluys & Adolphson LLP

[57] ABSTRACT

A method of coating a fishing fly to improve the durability and wetting character of the fly. The coating is applied using gas deposition, encapsulating the fly with a water barrier while preserving its micro-details. The typical coating is odorless and colorless, and increases the longevity of the fly. The wetting character imparted by the method results from the choice of gas deposited on the fly. In coating a dry-type fly, the method uses a gas that will make the fly hydrophobic so that it floats after a significantly greater number of immersions than an uncoated fly. In coating a wet-type fly, the method uses a gas that will make the fly hydrophilic so that it submerges in less time than an untreated fly.

20 Claims, 5 Drawing Sheets

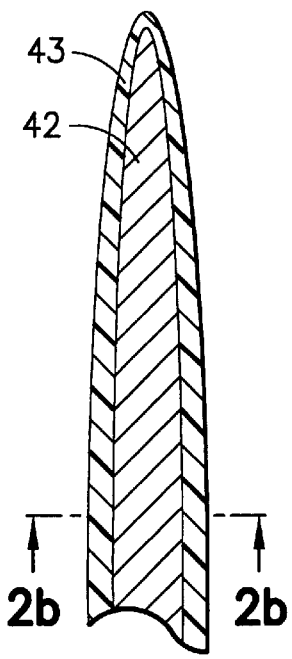
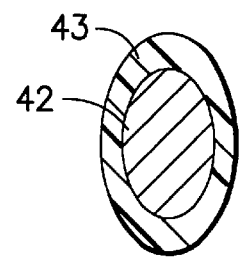
FIG.2a  FIG.2b
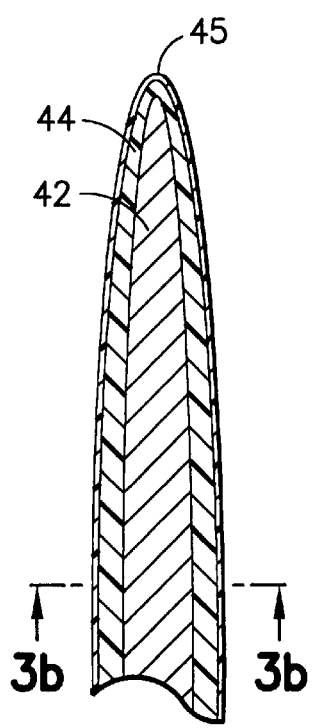
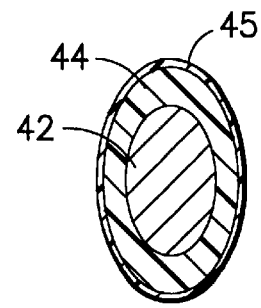
FIG.3a  FIG.3b

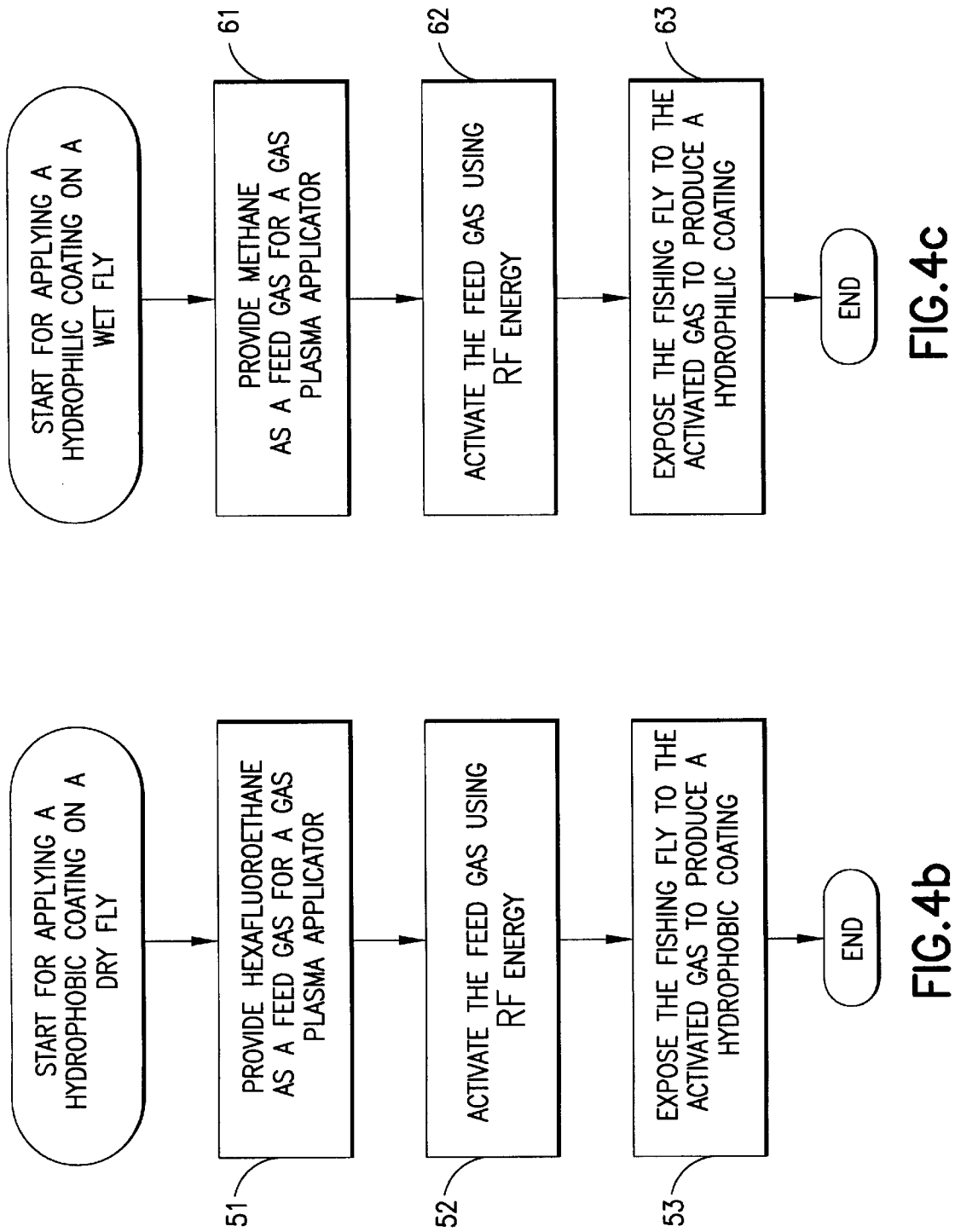

METHOD OF COATING A FISHING FLY AND A FISHING FLY COATED THEREBY

BACKGROUND OF THE INVENTION

1. Technical Field

The present invention relates to a fishing fly. More particularly, the present invention relates to a method for coating a fishing fly to extend its useful life, and to provide it with advantageous wetting properties, either hydrophobic or hydrophilic. The present invention also relates to a fishing fly coated thereby.

2. Prior Art

There are two principle types of fishing fly used in the sport of fly fishing: dry flies and wet flies. Dry flies are made to imitate insects that tend to float on the surface of streams, rivers or lakes. Wet flies are made to imitate aquatic species swimming beneath the surface.

A dry-type fly is typically constructed by tying pieces of different natural materials, such as hackle feathers from chicken or pheasant, or fur hairs from mammals, such as elk or deer, to a hook. Ordinarily, a dry fly no longer floats after only a few immersions in water, typically less than six, because the feathers or hairs wet and absorb water. Once a fly's feathers or hair become soaked, the fly sinks rendering it useless until it dries thoroughly. A dry fly will also typically sink after contact with mucus from fish, because the mucus is sticky and will tend to deform the fly shape and make the feathers or hair of the fly wet more easily.

A wet-type fly is typically constructed by tying to a hook either natural material, such as parts of feathers or animal hairs, or synthetic materials, such as man-made fibers. There are both freshwater and saltwater wet-type flies. They are constructed to submerge quickly after being cast, and to remain underwater as they are reeled in, imitating particular kinds of aquatic species, such as a nymph.

Wet and dry-type fishing flies made according to traditional methods, without any special treatment, have various drawbacks. Both are fragile. Both are damaged by fish biting, and by casting from air friction, slapping the water surface, and hitting rocks and other hard objects. Most wet-type fishing flies require a long time to submerge after casting, so fishermen perform various maneuvers to make the fly submerge more quickly. Performing these maneuvers delays presenting the fly to a fish, and may even scare away the fish. Finally, unless a fly is thoroughly dried after use, its hook if metal will tend to rust, and hackle and hair fibers, and any other filaments, will mat and mold.

To overcome these and other drawbacks of flies made according to traditional methods, without any special treatment, various methods have been tried. Dry flies are sometimes manually coated using a chemical floatant, either a liquid, such as silicone oil or a solid, such as wax. When using a liquid floatant, a fisherman usually dips a fly into a container of the floatant or sprays the fly with the floatant. When using a solid floatant, a fisherman usually rubs a fly with a powdered floatant wax, and then heats the fly at 100° F. or higher to melt the wax and to make it flow so that it covers the fly. With either of these floatants, the fly must first be dried.

Dry flies are also treated with chemicals called desiccants, which absorb moisture. Desiccants are applied by shaking a fly in a container containing a desiccant, such as a powdered carbonate or silica, until the desiccant absorbs the moisture from the fly.

Manually coating a fly with a floatant is difficult when fishing. It is also impractical, especially when a fisherman is standing in a fast moving stream, because it requires that the fisherman dry the soaked fly before treating it. Also, many of the liquid-type floatants are oily, and therefore, messy.

Neither the liquid nor solid floatant penetrates between the individual fibers, hairs, and other filaments of a fly. Instead, these floatants tend to bridge over, compact and mat filamentous components of a fly, which deforms the fly, making it less attractive to fish.

Most importantly, neither liquid nor waxy floatant improves the buoyancy of a dry fly. In laboratory tests that simulate actual fishing, dry flies treated with these floatants sank after only a few brief immersions in water. Thus, the improvement over an untreated dry fly is believed to be marginal.

Also, none of these floatants stop or significantly slow the filamentous materials from absorbing water, since these floatants do not provide a water barrier. In actual fishing, a dry fly is backcast several times. This violent motion tends to shake water off the surface of the fly being cast, but will not rid the fly of water it has absorbed. Since the floatants in use now, according to test, are largely ineffective in preventing absorption, backcasting is relatively ineffective in keeping a dry fly from sinking even after only a few casts.

Finally, the marginal improvements provided by the floatants of the prior art are only temporary. The floatants must be reapplied repeatedly, usually after every five or six casts, because they wash off or are jarred loose by stresses encountered in fishing.

Existing methods of improving a wet fly have focused on making the fly submerge faster. For the fly to submerge, it must be, on average, more dense than water, and it must also break the surface tension of the water. Existing methods adopt a brute force approach: they add to the body of the fly or to the leader of a fishing line attached to the fly high density materials such as lead. Unfortunately, this approach makes the fly harder to cast and harder to maneuver in the water.

What is needed is a way to treat both wet flies and dry flies to make them more durable, to make a dry fly float longer, and to make a wet fly sink faster without making it much heavier. In addition, the treatment should be substantially permanent.

SUMMARY OF THE INVENTION

The present invention is a method for coating a fishing fly to improve its durability and to provide hydrophobic or hydrophilic properties, depending upon the type of fly treated, by exposing the fishing fly to a reactive gas to produce a coating, made from the constituents of the gas, that conforms to the surface of the fly, including the surface of any microdetail of the filamentous components.

The method of the present invention also provides for further coatings created by depositing one or more coatings on top of a first coating. In most cases, unless a fisherman prefers another arrangement, a dry-type fishing fly is first coated with a durability layer and then given an outer hydrophobic coating. A wet-type fishing fly is first coated with the same kind of durability coating and then given an outer hydrophilic coating. However, either type of fly may be treated with only a single durability coating, and alternatively the durability coating may be omitted from either type of fly, usually in the case that the fishing fly is made of artificial materials.

Thus, an object of the present invention is to improve the durability of a fishing fly.

Another object of the present invention is to make a dry-type fly more hydrophobic.

It is also an object of the present invention to make a wet-type fly more hydrophilic.

The above and other objects, features and advantages of the invention will become apparent from a consideration of the subsequent detailed description presented in connection with the accompanying drawings.

BRIEF DESCRIPTION OF THE DRAWINGS

The drawings, not drawn to scale, include:

FIG. 2a and FIG. 2b are cross sectional views of a fishing fly fibril having a single coating according to the present invention;

FIG. 3a and FIG. 3b are cross sectional views of a fishing fly fibril having two coatings according to the present invention;

FIG. 4b is a process diagram illustrating the method steps for providing a hydrophobic coating on a dry-type fishing fly;

FIG. 4c is a process diagram illustrating the method steps for providing a hydrophilic coating on a wet-type fishing fly.

DETAILED DESCRIPTION OF THE INVENTION

A COATED FISHING FLY

Figure 1A:
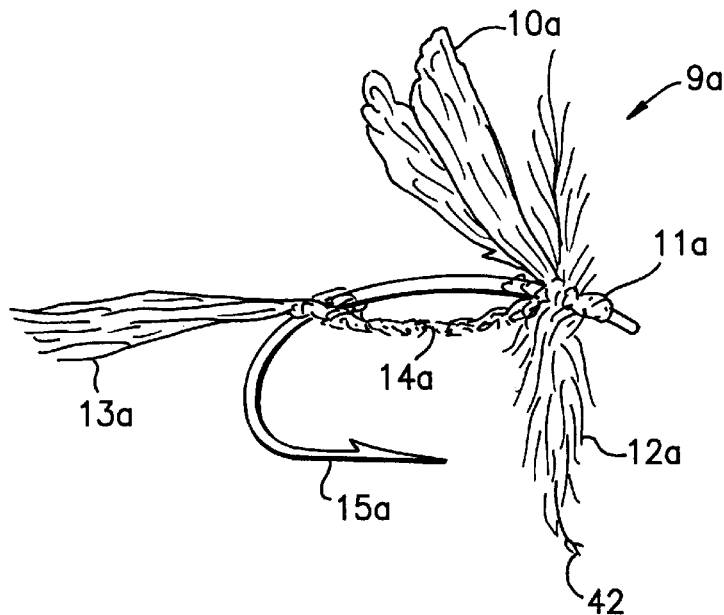
FIG. 1a is a perspective view of a typical dry fly.

As illustrated in FIG. 1a, a typical dry-type fly 9a has various filamentous materials attached to a hook 15a. In the example shown in FIG. 1a, the filamentous materials form a wing 10a, a head 11a, hackle 12a, and a tail 13a, all protruding from a body 14a adjacent the shank of the hook 15a.

Figure 1B:
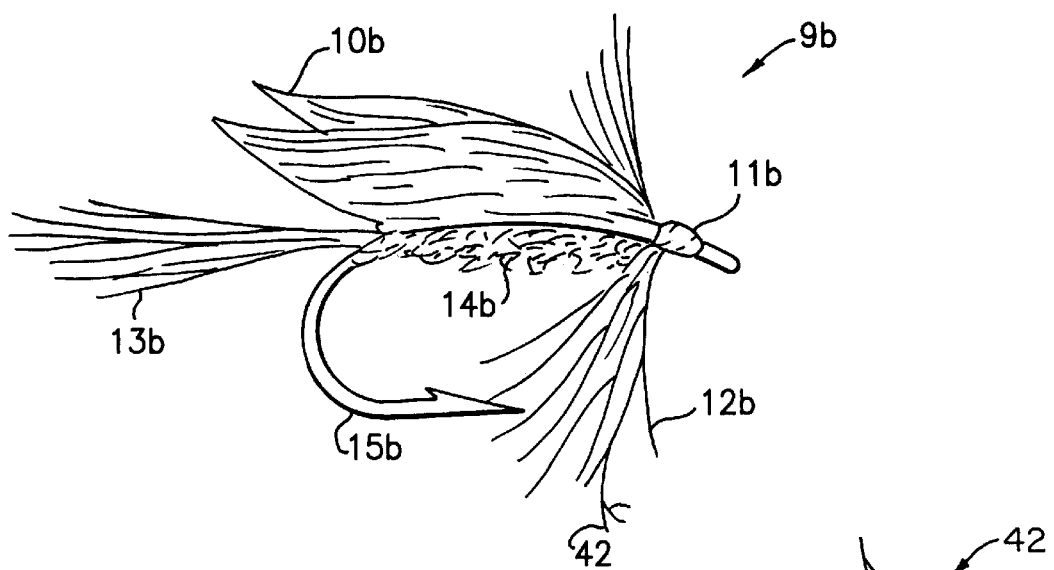
FIG. 1b is a perspective view of a typical wet fly.

Referring now to FIG. 1b, a typical wet-type fly 9b is also made of various filamentous materials organized about a hook 15b. A wet-type fly is distinguished from the dry-type fly 9a in that the wings 10b of the wet-type fly lie more parallel to the body 14b so as to pull more easily through the water while the fly is submerged. The typical wet-type fly also includes a head 11b, hackle 12b, and a tail 13b formed from filamentous materials.

Figure 1C:
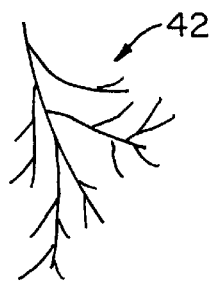
FIG. 1c is a perspective view of fibrils arranged in a pine-tree like structure.

The filamentous materials used with either type of fly include the feathers, hairs, and fibers. Such materials are typically composed of many fibrils 42, indicated in both FIG. 1a and FIG. 1b, which are sometimes arranged in a fine pine-tree-like structure, as illustrated in FIG. 1c. The present invention, which will be described more fully below, provides a coating that encapsulates each individual fibril 42, as well as the fine details thereof. The coating, not shown in FIG. 1a or FIG. 1b, is conformal to the surface of a fishing fly, and preserves the fine detail of the filamentous material, such as the pine-tree-like structure shown in FIG. 1c; individual fibrils are not clumped together by the coating. The coating may also encapsulate all other surface areas of the fly, such as the hook, for example. The coatings are a substantially pinhole-free skinlike covering on the components of the fly, and provide a barrier to water. Therefore, the fly wets during fishing only on its surface, and simple backcasting, which is a normal part of fly fishing, will shed any water on the fly. In addition, because the coatings are very thin and are odorless and colorless, they do not change the luring characteristics of the fly.

Referring now to FIG. 2a and FIG. 2b, a single fibril 42 is shown, in two cross sections, with a coating 43 obtained according to the present invention. Such a fibril represents a component of any of the various filamentous materials used in either type of fly to form the wing 10a&b, head 11a&b, hackle 12a&b, tail 13a&b, or body 14a&b. The coating 43 may be either a durability coating, a hydrophobic coating, or a hydrophilic coating. The durability coating is optional because some fishing flies may be made mostly of artificial materials such as plastics, and so may not need waterproofing or strengthening. The durability coating offers a significant strengthening of a fly's resistance to the stresses encountered by the fly during fishing. The coating 43 may also be applied to the hook 15a&b of the fly.

The durability coating, as well as the other coatings described below, also protects the metal hook of the fly against rusting. The durability coating according to the present invention is also a barrier to fish slime, which makes an untreated fly sticky and no longer useable. The slime on a fly treated according to the present invention is easily removed by washing in plain water. Also, because any coating according to the present invention has a very low coefficient of friction, a fly treated according to the present invention is at least as easy to cast as without a coating.

The present invention also provides for additional coatings. FIG. 3a and FIG. 3b show a single fibril 42, in two cross sections, with two coatings 44, 45 according to the present invention. In this embodiment, the first coating 44 is typically a durability coating, and the second coating 45 is added to render the fly either hydrophobic or hydrophilic, depending on the type of fly being improved.

METHOD FOR COATING A FISHING FLY

The method provides for applying a durability coating and either a hydrophobic coating or a hydrophilic coating, depending on the type fishing fly being improved.

Deposit of a Durability Coating

For either type of fishing fly, the method of the present invention provides a coating for durability, which will also waterproof the fly since it provides a barrier to the ingress of water. Either of two procedures can be used to apply a durability coating. One procedure uses a gas plasma applicator, and the other procedure, used in the preferred embodiment, performs xylylene polymerization and deposition using a device such as the Parylene Deposition System, Model 1050, made by Union Carbide Corporation.

Figure 4A:
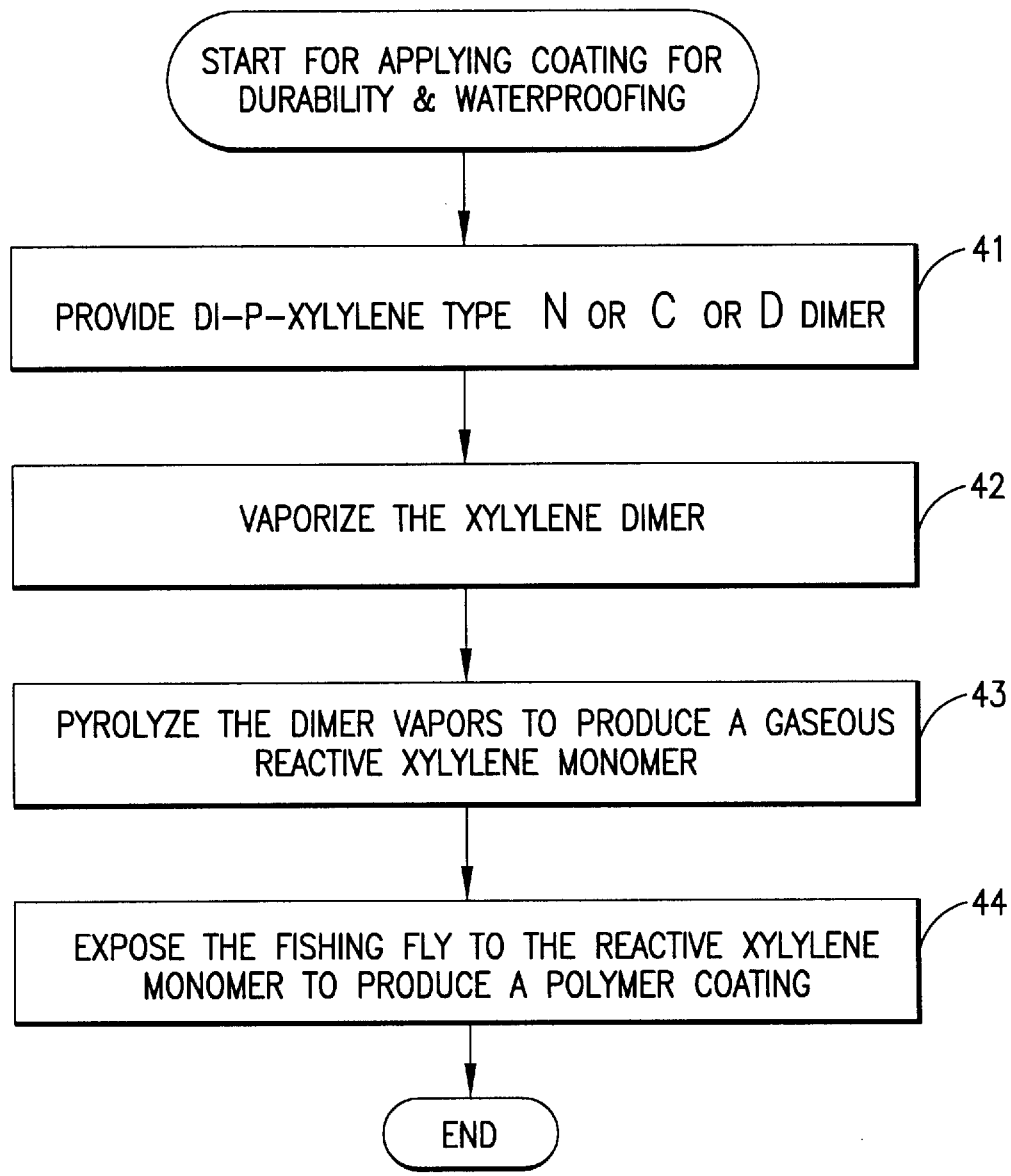
FIG. 4a is a process diagram illustrating the method steps for providing a durability and water barrier coating on a fishing fly.

Referring now to FIG. 4a, in the preferred embodiment, the durability coating is obtained by first providing di-p-xylylene type N, C, or D dimer (step 41), then performing the following three steps:

vaporization of the di-p-xylylene type N, C or D dimer at a temperature from approximately 100° to 160° C., preferably from about 100° to 150° C., to form dimer vapors (step 42);

pyrolysis of the dimer vapors at temperatures from approximately 600° to 750° C., preferably from about 650° to 700° C., to produce a reactive gaseous type N, C or D para-xylylene monomer (step 43); and exposing the fly to the reactive gas at room temperature under near vacuum conditions, from approximately 10 to 500 microns Hg, preferably from about 40 to 150 microns Hg, allowing the gas to deposit and simultaneously polymerize on the fly to form a poly-para-xylylene coating on the surface of the fly (step 44).

In addition to xylylene monomers, the durability coating can be provided using other gases as raw materials if a gas plasma applicator or a corona discharge applicator is used in place of a polymerization and deposition device. With a gas plasma applicator or a corona discharge applicator, the other gases that may be used as raw materials include hydrocarbon aliphatic gases such as methane, gases that contain fluorine, such as tetrafluoromethane and hexafluoroethylene, and gases made from materials that contain silicon, such as hexamethyl disiloxane. Using these applicators with these raw materials to provide the durability coating will also produce a polymeric coating, which is important to make the coating tough.

An example of a gas plasma applicator that can be used to create the durability coating on the fly is the model BT-1 made by Plasma Etch Company. When using a gas plasma applicator, a chamber of the applicator is provided with a feed gas at a feed rate of less than approximately 300 cc/min, preferably from about 50 to 200 cc/min. The gas in the chamber is maintained at a temperature from approximately −40° to 100° C., preferably from about 10° to 30° C., and at a pressure of less than about one torr, preferably from approximately 0.1 to 0.5 torr. The feed gas is rendered a reactive gas by applying radiofrequency (RF) power of less than about 300 watts, preferably from about 50 to 150 watts, at any radiofrequency. A frequency of about 13.56 MHz was found to be satisfactory. The fishing fly should be held in the chamber for a period of up to approximately two hours, and preferably from about 30 to 90 minutes.

Depositing a Hydrophobic Coating

To render a dry-type fishing fly more hydrophobic so that it will float longer, a hydrophobic coating is applied to the surface of the fishing fly. Referring now to FIG. 4b, in the preferred embodiment, a gas plasma applicator, such as model BT-1 made by the Plasma Etch Company, is used to create the hydrophobic coating. In this embodiment, hexafluoroethane is provided as a feed gas, and introduced into a chamber of a gas plasma applicator at a feed rate of approximately 100 cc/min. The gas in the chamber is maintained at about 20° C., and at a near vacuum pressure of about 0.03 torr (step 51). Approximately 100 watts of RF power at about 13.56 Mhz is applied to the gas in the chamber to render it a reactive gas (step 53). The fishing fly is placed in the chamber where it is exposed to the reactive gas for approximately one hour (step 54), which produces a hydrophobic coating thereon. A liquid can be used as a raw material, but if a liquid is used it must then be vaporized into a feed gas.

The hydrophobic coating can also be applied using a corona discharge applicator, and using the same feed gas as would be used in a gas plasma applicator. However, in this case, the feed gas in the corona discharge applicator is held at atmospheric pressure, not the near vacuum pressures used in the gas plasma applicator, and the fishing fly is exposed to the reactive gas longer to produce a coating of the same thickness.

More generally, the raw materials for use in either applicator are those that contain either fluorine or silicon atoms. Examples of a fluorine containing gas that can be used are: tetrafluoromethane, sulfur hexafluoride, tetrafluoroethylene, tetrafluoroethane, hexafluoroethane, hexafluoropropylene, and octafluoropropylene. The silicon-containing materials that can be used include tetramethyl silane, methyltrimethoxy silane, vinyltrimethyl silane, hexamethyl disiloxane, tetramethyl disiloxane, hexamethyl disilazane.

Depositing a Hydrophilic Coating

To render a wet-type fishing fly more hydrophilic so that it will submerge faster, the present invention applies a hydrophilic coating to the surface of the fishing fly.

Referring now to FIG. 4c, in the preferred embodiment, methane is fed to a chamber of a gas plasma applicator, such as model BT-1 made by Plasma Etch Company (step 61). The feed gas is provided at a feed rate of less than about 300 cc/min, preferably from about 2 to 100 cc/min. The gas in the chamber is maintained at a temperature between approximately −40° and 100° C., preferably from approximately 10° to 30° C., and at a pressure of less than approximately one torr, preferably from about 0.1 to 0.5 torr. The feed gas is rendered a reactive gas by the application of RF power at 13.56 Mhz, for example, at a power level from about 5 to 200 watts, preferably from about 20 to 120 watts (step 62). The fishing fly is exposed to the reactive gas for a period of up to approximately two hours, preferably from about 30 to 90 minutes (step 63). It has been found that a suitable coating can be obtained when a wet-type fishing fly is placed in a gas plasma applicator where methane is introduced for approximately 60 minutes at a feed rate of about 10 cc/min, and the applicator is held at about 20° C. and about 0.05 torr. The applicator is operated at an RF power under approximately 30 watts, at a frequency of about 13.56 Mhz.

The hydrophilic outer coating can be provided using either a gas plasma applicator or a corona discharge applicator, in a manner similar to the application of the hydrophobic outer coating on a dry-type fly described above. The raw material that may be used with the method for providing a hydrophilic coating include compounds containing hydrocarbons, such as aliphatics, e.g. methane, ethane, ethylene, and acetylene; and aromatics, e.g. toluene and styrene; and also compounds containing oxygen, nitrogen, chlorine or bromine. Examples of the last group of compounds include ammonia, water, acrylate monomers, nitrile monomers, vinyl chloride monomers, allyl bromides, diisocyanates, and pyrolidones.

Multiple Coatings

According to the present invention, multiple coatings on either type of fly can also be obtained. For example, a fly is first provided with a durability coating as described above, and then with a second coating that is hydrophobic in the case of improving a dry-type fly, or hydrophilic in the case of improving a wet-type fly. In another aspect of the present invention, either type of fly is cleaned, using a gas plasma treatment, before a coating is applied.

Figure 5:
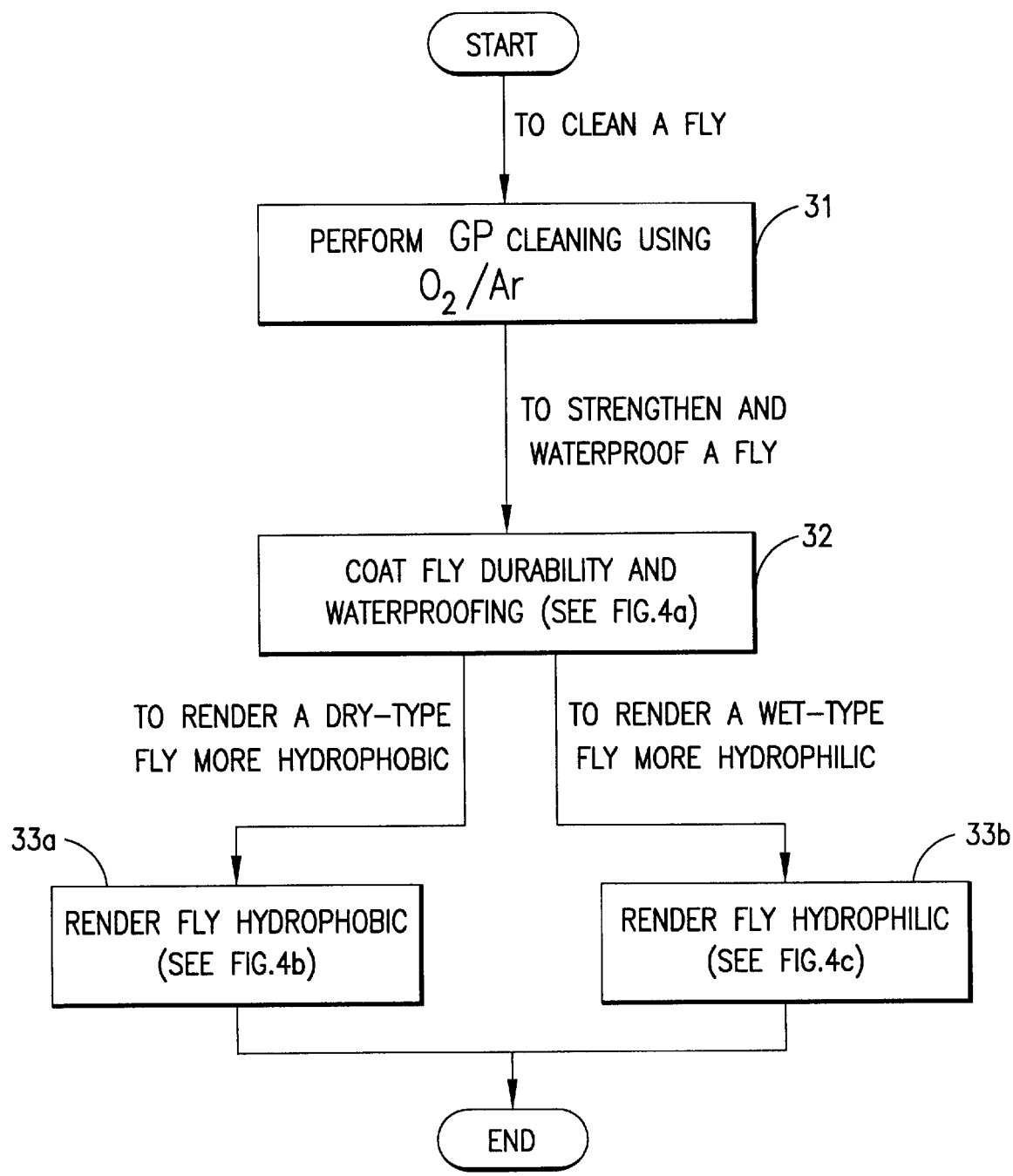
FIG. 5 is a diagram illustrating the method steps for the application of two coatings to a fishing fly by the method of the present invention.

Referring now to FIG. 5, the method for obtaining multiple coatings is illustrated in a process chart showing several steps for coating either a wet-type or dry-type fly. In one aspect of the present invention, either type of fly is first cleaned in cleaning step 31. To clean the fly, it is placed into a chamber of a gas plasma applicator, where argon or oxygen, or a combination of these gases is introduced at feed rates of up to approximately 200 cc/min, preferably from about 50 to 150 cc/min, at a temperature from approximately −40° to 100° C., preferably from about 10° to 30° C., and at a pressure of less than about one torr, preferably from approximately 0.1 to 0.5 torr. To render the cleaning gas reactive, RF power at a frequency of about 13.56 Mhz is applied to the feed gas in the chamber, at a power level of up to about 300 watts, preferably from about 50 to 250 watts.

The fly is exposed to the reactive cleaning gas for up to approximately one hour, preferably from about 5 to 30 minutes. The gas plasma cleaning can be performed using the model BT-1 gas plasma applicator made by Plasma Etch Company.

Next, the method of the present invention includes step 32 for providing a durability coating on either type of fly as previously described (see FIG. 4a). Finally, in the method of the present invention, either a hydrophobic coating is applied as described above, and illustrated in detail in FIG. 4b (step 33a), or a hydrophilic coating is applied as described above, and illustrated in detail in FIG. 4c (step 33b).

It is to be understood that the above-described arrangements are only illustrative of the applications of the principles of the present invention. In particular, it is to be understood that the ranges of various physical parameters disclosed here are in no way intended to exclude other values of the parameters. The values recited are offered as having been determined to provide reasonable results using the particular equipment named in this specification. In that connection as well as for all of what is here disclosed, it is to be understood that numerous modifications and alternative arrangements may be devised by those skilled in the art without departing from the spirit and scope of the present invention, and the appended claims are intended to cover such modifications and arrangements.

What is claimed is:

1. A method for coating a fishing fly having a hook and filamentous materials attached thereto, the method comprising the step of exposing the fishing fly to a reactive gas, whereby the reactive gas forms a coating on a portion of the fly.

2. The method for coating a fishing fly set forth in claim 1, wherein the reactive gas is selected from the group consisting of a xylylene monomer, a xylylene dimer, a hydrocarbon gas, a fluorine-bearing gas, a nitrogen-bearing gas, an oxygen-bearing gas, a chlorine-bearing gas, and a silicon-bearing gas.

3. The method for coating a fishing fly set forth in claim 1, further comprising the steps of:
providing a dimer selected from the group consisting of di-p-xylylene type N, di-p-xylylene type C and di-p-xylylene type D;
vaporizing the dimer at a predetermined vaporization temperature to form dimer vapors; and
pyrolyzing the dimer vapors at a predetermined pyrolyzation temperature to form the reactive gas;
wherein, in exposing the fishing fly to the reactive gas, the reactive gas is deposited and polymerized on the fishing fly at a predetermined exposure temperature and predetermined exposure pressure.

4. The method for coating a fishing fly set forth in claim 3, wherein the predetermined vaporization temperature is approximately 100° to 160° C., wherein the predetermined pyrolyzation temperature is approximately 600° to 750° C., wherein the predetermined exposure temperature is approximately room temperature and wherein the predetermined exposure pressure is approximately 10 to 500 microns Hg.

5. The method for coating a fishing fly set forth in claim 1, further comprising the steps of:
providing a feed gas selected from the group consisting of a fluorine bearing gas and a silicon-bearing gas;
providing a gas plasma applicator having a chamber;
introducing the feed gas into the chamber at a predetermined feed rate;
maintaining the feed gas in the chamber at a predetermined temperature and predetermined pressure; and
applying RF power at a predetermined frequency and predetermined power level to the feed gas in the chamber to form the reactive gas;
wherein, in exposing the fishing fly to the reactive gas, the fishing fly is placed in the chamber with the reactive gas for a predetermined period of time, whereby the reactive gas forms a hydrophobic coating on a portion of the fly.

6. The method for coating a fishing fly set forth in claim 5, wherein the predetermined feed rate is approximately 100 cc/min, wherein the predetermined temperature is about 20° C., wherein the predetermined pressure is about 0.03 torr, wherein the predetermined frequency is about 13.56 Mhz, wherein the predetermined power level is about 100 watts, and wherein the predetermined period of time is approximately one hour.

7. The method for coating a fishing fly set forth in claim 5, wherein the feed gas is hexafluoroethane.

8. The method for coating a fishing fly set forth in claim 1, further comprising the steps of:
providing a feed gas selected from the group consisting of a hydrocarbon gas, a nitrogen-bearing gas, an oxygen-bearing gas and a chlorine-bearing gas;
providing a gas plasma applicator having a chamber;
introducing the feed gas into the chamber at a predetermined feed rate;
maintaining the feed gas in the chamber at a predetermined temperature and predetermined pressure; and
applying RF power at a predetermined frequency and predetermined power level to the feed gas in the chamber to form the reactive gas;
wherein, in exposing the fishing fly to the reactive gas, the fishing fly is placed in the chamber with the reactive gas for a predetermined period of time, whereby the reactive gas forms a hydrophilic coating on a portion of the fly.

9. The method for coating a fishing fly set forth in claim 8, wherein the predetermined feed rate is up to about 300 cc/min, wherein the predetermined temperature is about −40° to 100° C., wherein the predetermined pressure is less than approximately one torr, wherein the predetermined frequency is about 13.56 Mhz, wherein the predetermined power level is about 5 to 200 watts, and wherein the predetermined period of time is approximately 30 to 90 minutes.

10. The method for coating a fishing fly set forth in claim 8, wherein the feed gas is methane.

11. A fishing fly comprising:
a hook;
filamentous materials attached to the hook; and
a coating conformal to at least the filamentous materials, wherein the coating is obtained by exposing the fishing fly to a reactive gas.

12. The fishing fly set forth in claim 11, wherein the reactive gas is a gas selected from the group consisting of a xylylene monomer, a xylylene dimer, a hydrocarbon gas, a fluorine-bearing gas, a nitrogen-bearing gas, an oxygen-bearing gas, a chlorine-bearing gas, and a silicon-bearing gas.

13. The fishing fly set forth in claim 11, wherein the reactive gas is obtained by a method comprising the steps of:
providing a dimer selected from the group consisting of di-p-xylylene type N, di-p-xylylene type C and di-p-xylylene type D;
vaporizing the dimer at a predetermined vaporization temperature to form dimer vapors; and pyrolyzing the dimer vapors at a predetermined pyrolyzation temperature; and wherein the fly is exposed to the reactive gas at a predetermined exposure temperature and predetermined exposure pressure.

14. The fishing fly set forth in claim 13, wherein the predetermined vaporization temperature is approximately 100° to 160° C., wherein the predetermined pyrolyzation temperature is approximately 600° to 750° C., and wherein the predetermined exposure temperature is approximately room temperature and the predetermined exposure pressure is approximately 10 to 500 microns Hg.

15. The fishing fly set forth in claim 11, wherein the reactive gas is obtained by a method comprising the steps of:

providing a feed gas selected from the group consisting of a fluorine-bearing gas and a silicon-bearing gas;

providing a gas plasma applicator having a chamber;

introducing the feed gas into the chamber at a predetermined feed rate;

maintaining the feed gas in the chamber at a predetermined temperature and predetermined pressure;

applying RF power at a predetermined frequency and predetermined power level to the feed gas in the chamber; and wherein the fishing fly is exposed to the reactive gas in the chamber for a predetermined period of time to form a hydrophobic coating on a portion of the fly.

16. The fishing fly set forth in claim 15, wherein, in the method of obtaining the reactive gas, the predetermined feed rate is approximately 100 cc/min, wherein the predetermined temperature is about 20° C., wherein the predetermined pressure is about 0.03 torr, wherein the predetermined frequency is about 13.56 Mhz, wherein the predetermined power level is about 100 watts;

and wherein the predetermined period of time in which the fly is exposed to the reactive gas is approximately one hour.

17. The fishing fly set forth in claim 15, wherein the feed gas is hexafluoroethane.

18. The fishing fly set forth in claim 11, wherein the reactive gas is obtained by a method comprising the steps of:

providing a feed gas selected from the group consisting of methane gas, a nitrogen-bearing gas, an oxygen-bearing gas and a chlorine bearing gas;

providing a gas plasma applicator having a chamber;

introducing the feed gas into the chamber at a predetermined feed rate;

maintaining the feed gas in the chamber at a predetermined temperature and predetermined pressure;

applying RF power at a predetermined frequency and predetermined power level to the feed gas in the chamber; and wherein the fishing fly is exposed to the reactive gas in the chamber for a predetermined period of time to form a hydrophilic coating on a portion of the fly.

19. The fishing fly set forth in claim 18, wherein, in the method of obtaining the reactive gas, the predetermined feed rate is up to about 300 cc/min, wherein the predetermined temperature is about −40° to 100° C., wherein the predetermined pressure is less than approximately one torr, wherein the predetermined frequency is about 13.56 Mhz, wherein the predetermined power level is about 5 to 200 watts;

and wherein the predetermined period of time in which the fly is exposed to the reactive gas is approximately 30 to 90 minutes.

20. The fishing fly set forth in claim 18, wherein the feed gas is methane.

* * * * *